March 10, 1925.

E. G. THOMAS

WEIGHING SCALE

Filed April 26, 1920

Inventor
EDWARD G. THOMAS.

By George R. Frye

Attorney

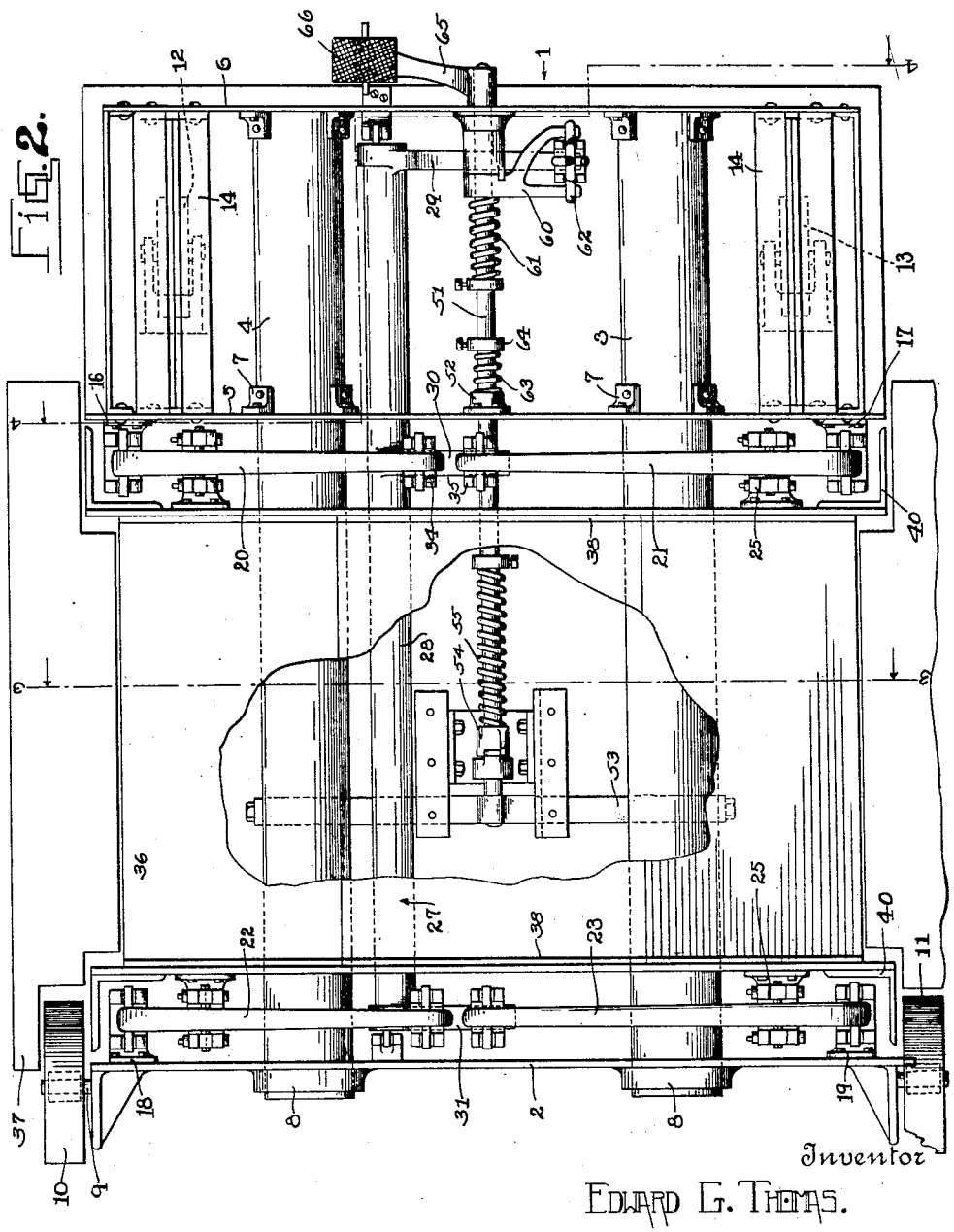

March 10, 1925.  
E. G. THOMAS  
WEIGHING SCALE  
Filed April 26, 1920  
1,528,899  
4 Sheets-Sheet 3
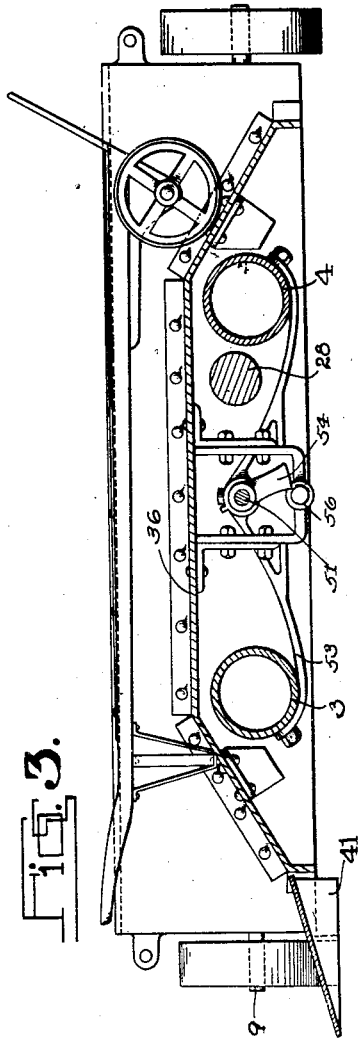
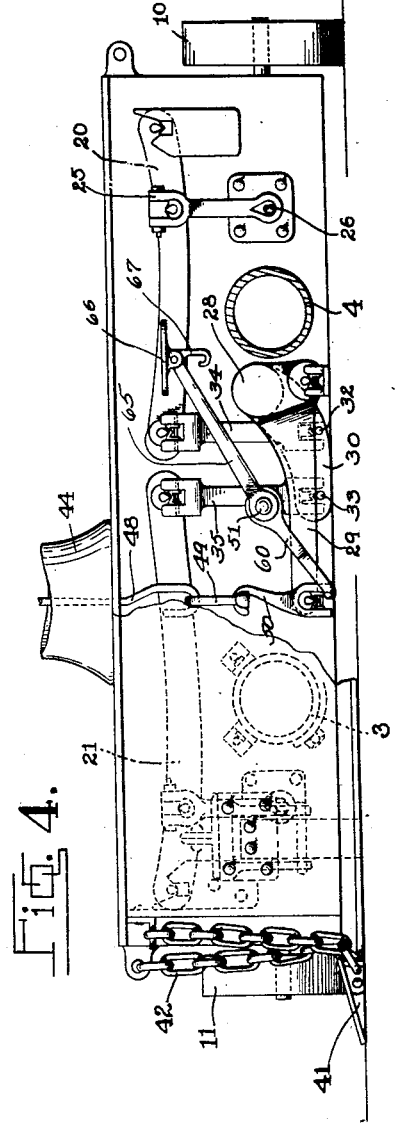
Inventor  
EDWARD G. THOMAS.  
By George R. Frye  
Attorney

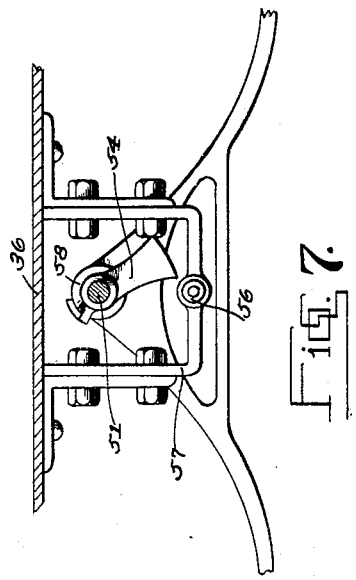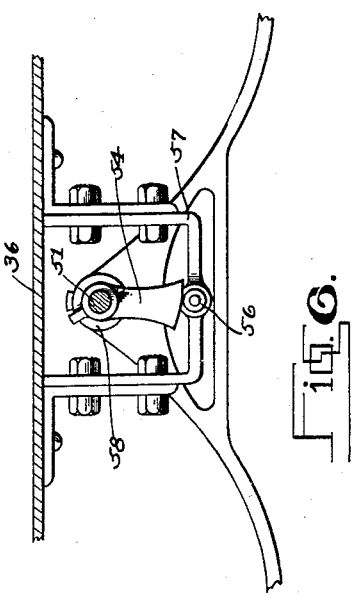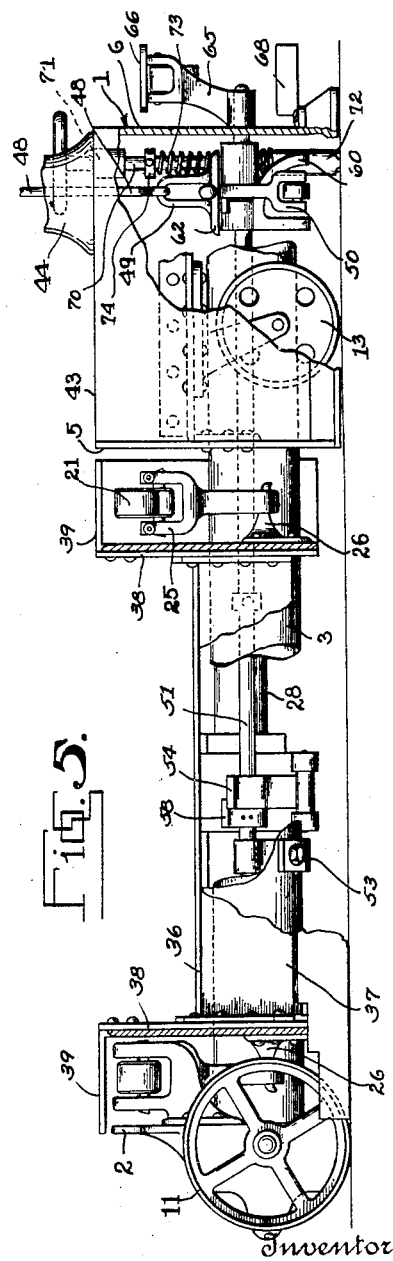

Patented Mar. 10, 1925.

1,528,899

UNITED STATES PATENT OFFICE.

EDWARD G. THOMAS, OF TOLEDO, OHIO, ASSIGNOR TO TOLEDO SCALE COMPANY, OF TOLEDO, OHIO, A CORPORATION OF NEW JERSEY.

WEIGHING SCALE.

Application filed April 26, 1920. Serial No. 376,807.

*To all whom it may concern:*

Be it known that I, EDWARD G. THOMAS, a citizen of the United States, residing at Toledo, in the county of Lucas and State of Ohio, have invented certain new and useful Improvements in Weighing Scales, of which the following is a specification.

This invention relates to weighing scales, and particularly to the types of scales usually called portables, by reason of the fact that they are mounted upon wheels and may be readily moved about. The framework of a scale of this type usually comprises a base housing containing the platform levers and a standard, which supports the load-offsetting mechanism, secured upon a solid deck at one end of the base housing. The commodity-receiving platform is supported upon the platform levers and necessarily lies some distance above the floor, so that the commodity to be weighed must be lifted to the platform, and if it is desired to weigh articles carried on trucks, ramps must be provided to permit the trucks to be wheeled from the floor level to the level of the weighing platform. These ramps must be of considerable length in order that they shall not be so steep as to render it difficult to push a truck up the slope.

The principal object of my invention is to provide a portable scale having a very low platform, so that the height to which a commodity must be raised will be reduced to a minimum.

Another object is to provide a scale capable of being used with comparatively short ramps so that the entire weighing equipment may be accommodated within a minimum of floor space.

Still another object is to provide novel and convenient means for locking the operating parts of the scale against movement, so that the scale may be moved from place to place or trucked over without liability of damage to the pivots and bearings and the sensitive load-offsetting mechanism.

Other objects and advantages will be apparent from the following description, in which reference is had to the accompanying drawings illustrating a preferred embodiment of my invention and wherein similar reference numerals designate similar parts throughout the several views.

In the drawings:—

Figure 2 is a plan view of the base and platform of the scale, parts being removed, and other parts being broken away to show the lever mechanism;

Figure 3 is a vertical section through the commodity-receiver showing a hand truck thereon in position to be weighed;

Figure 4 is a front elevation of the base of the scale with the standard removed, parts being broken away for clearness of illustration;

Figure 5 is a side view of the base, partly in elevation and partly in section, parts being broken away;

Figure 6 is an enlarged fragmentary detail view showing the platform locking device in locked position; and Figure 7 is a similar view showing the device in unlocked position.

Figure 1:
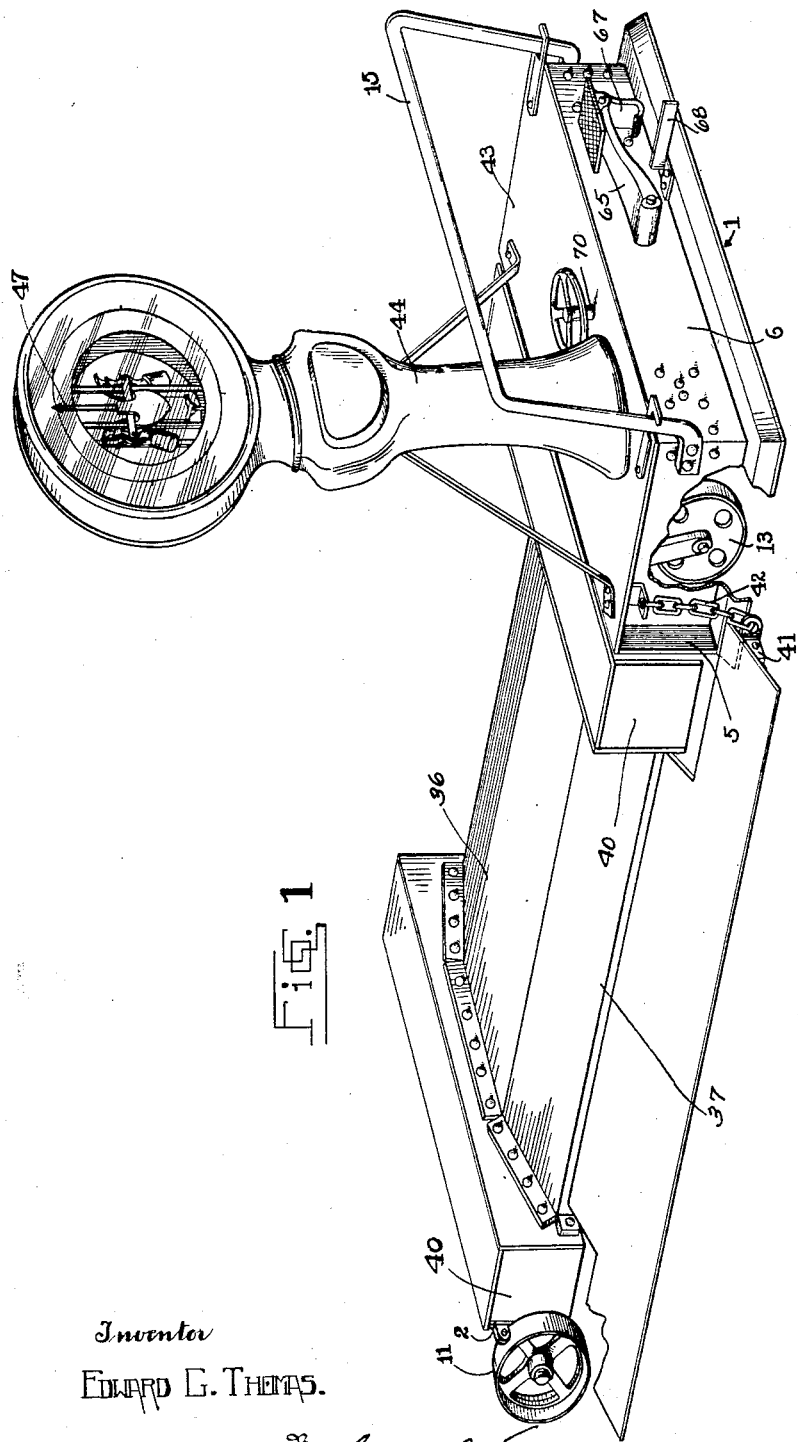
Figure 1 is a perspective view of a scale constructed in accordance with my invention, parts being broken away.

The frame of the scale as illustrated comprises a box-shaped housing 1 and a plate-like end casting 2 permanently and rigidly connected by means of a pair of longitudinally-extending members 3 and 4, shown in this instance as formed of pieces of heavy pipe, which are secured to the front and rear walls 5 and 6 of the housing 1 by means of suitable angle pieces 7 and two bosses 8 in the end casting 2. The housing 1, the longitudinally-extending members 3 and 4, and the end casting 2 thus form a structure of sufficiently rigid nature to serve as the framework upon which the scale is built. Flanges projecting rearwardly from the end casting 2 each support an axle 9 upon which are mounted carrying wheels 10 and 11, while the forward end of the frame is supported upon castors 12 and 13 swivelly connected to girders 14 secured to the front and rear walls of the housing 1. To facilitate handling the scale, a handle 15 is pivoted to the side walls of the housing 1, retaining hooks being provided to hold the handle in vertical position when desired.

Secured upon the front and rear faces respectively of the front wall 5 and the end casting 2 are fulcrum brackets 16, 17, 18 and 19 having V-groove bearings which support the fulcrum pivots of platform levers 20, 21, 22 and 23, which extend in pairs from adjacent the sides of the scale inwardly toward each other.

The commodity-receiver is supported from the load pivots of the levers 20, 21, 22 and 23 by means of shackles 25 having inverted V-groove bearings, which rest upon the knife edges of the load pivots, and having loops at their lower ends to receive bracket-fingers 26, which project forwardly and rearwardly from the forward and rear ends of the commodity-receiver.

Supported upon fulcrum brackets secured to the rear wall 6 of the housing and to the end casting 2 is a torsion lever 27, which preferably consists of a heavy shaft 28 having an arm 29 projecting laterally from its rearward end for connection with the load-offsetting mechanism of the scale and a pair of laterally-projecting arms 30 and 31 lying below the inner ends of the platform levers 20, 21, 22 and 23. Each of the arms 30 and 31 is provided with a pair of fixed load pivots 32 and 33 supporting thrust members 34 and 35, which in turn support the nose pivots of the platform levers.

In order that a load may exert the same torsional force on the shaft 28, regardless of its position on the commodity-receiver, it is necessary that the multiplication of each platform lever in combination with the co-operating arm of the torsion lever shall be the same. Inasmuch as the leverage of a force acting upon the pivot 32 is less than that of a force acting on the pivot 33, it is necessary that the force of a load on the lever 20 or 22 shall exert a greater compressive force on the thrust member 34 than is exerted on the thrust member 35 by an equal load on the lever 21 or 23. This result is, secured by making the distance between the fulcrum and nose pivots of the levers 20 and 22 less than the distance between the fulcrum and nose pivots of the levers 21 and 23, while the distance between the fulcrum and load pivots is the same in each instance. The same result may, of course, be obtained by otherwise arranging the levers so that equal torsional strains are transmitted to the shaft 28 by equal loads on the platform levers.

The commodity-receiver comprises a platform 36 having sloping approaches 37 at each side, which may be formed integral with the platform. Secured at each end of the platform and approaches is a vertically-extending plate to which are secured the commodity-receiving supporting bracket-fingers 26 above referred to. The platform levers 22 and 23 at the forward end of the scale lie beneath the forward plate 38 and the end casting 2, while the rearmost platform levers 20 and 21 lie between the rear plate 38 and the wall 5 of the housing 1. For the purpose of enclosing these levers, an angle piece is secured along the top edge of each plate 38 with its horizontal portion 39 overlying the levers, while upright angle pieces 40 are secured at the side edges of the plates 38 to enclose the levers at the sides.

Owing to the fact that the platform levers are removed from beneath the platform 36, the platform need be elevated only a sufficient distance to clear the longitudinally extending members 3 and the shaft 28, and the edges of the sloping approaches may be brought quite close to the floor. This makes it possible to use very short ramps 41 which are loosely connected to the frame of the scale by means of chains 42 so that they may be laid upon the scale when it is desired to move the apparatus from place to place and laid upon the floor to be trucked over when the scale is in position for weighing. As the sloping approaches 37 are partially inside the load pivots upon which the platform is supported, the overhang of the commodity-receiver is very slight, and there is, therefore, no danger of its tipping when a truck is rolled upon it.

The platform 36 is of sufficient area to support directly boxes and most other commodities in stable equilibrium for weighing. When the article to be weighed is carried upon a truck the truck may be positioned, as shown in Figure 3, with its wheels on one of the sloping approaches 37, while its legs rest on the other approach. When the truck is in this position the wheels cannot run down the one approach without dragging the legs up the other. The truck is thus perfectly stable. It is obvious that a four-wheeled truck placed with its front wheels on one of the approaches and its rear wheels on the other would also remain in position while being weighed.

The upper side of the housing 1 forms a deck 43 upon which is mounted a standard 44 to support the load-offsetting and indicating mechanism of the scale in convenient position for reading. It is to be understood that the platform mechanism of my scale may be used with load-offsetting mechanism of types other than that shown in the drawings—for example, that employed in beam scales or spring scales. I have chosen for illustration a scale having load-offsetting mechanism of substantially the type described and claimed in the U. S. patent to Hapgood, No. 1,203,611, dated Nov. 7, 1916, which is particularly adapted for use in the scale of my invention. The standard 44 is, in this instance, a hollow column supporting a substantially watch-casing shaped housing containing automatic pendulum load-offsetting mechanism and an indicating hand 47 connected thereto. From the load-offsetting mechanism a tension rod 48 depends through the column 44 and is connected at its lower end to a link 49, which is in turn connected to a stirrup 50 supporting the nose of the arm 29 (see Figures 4 and 5).

The operation of the mechanism so far described may be briefly stated as follows: When it is desired to weigh a load carried on a truck, the truck is pushed or pulled up one of the ramps 41 and one of the sloping approaches 37 and across the platform to the position shown in Figure 3. The force acting on the load pivots of the platform levers 20, 21, 22 and 23 will be transmitted through these levers and the thrust members 35 to the arms 30 and thence through the shaft 28 to the arm 29. The tension rod 48 will thus be drawn downwardly until the pendulum mechanism offsets the load.

In order to reduce the liability of damage to the pivots and bearings and to the indicating mechanism of the scale from shocks and jars to which the scale may be subjected in moving it from place to place, it is desirable that the pivots and bearings be so firmly held in their places during the movement of the scale that no separation or shifting of the parts which are in contact shall be possible. To this end I have provided the locking mechanism described below. A rock shaft 51 projects at one end through the rear wall 6 of the housing 1 and is journaled in a casting 52 secured to the front wall 5 of the housing and in a cross-piece 53 secured to the longitudinally-extending frame members 3. A cam 54 is rotatably mounted upon the shaft 51 and is connected thereto by means of a spring 55 so that unless restrained, the cam will rotate with the shaft. When the shaft is turned in a clockwise direction the cam surface engages a roller 56 which is journaled in the bight portion of yoke-shaped brackets 57 secured to the lower side of the platform 36. A collar 58 fixed upon the shaft 51 carries a laterally-projecting lug which, when the rod 51 is turned in a counter-clockwise direction, engages a laterally-projecting lug on the cam 54 and positively turns the cam to disengage it from the roller 56.

An arm 60 is mounted upon the rock shaft 51 and connected thereto by means of a spring 61, so that if movement of the arm is unresisted, the arm will turn with the shaft. The free end of the shaft is bifurcated and straddles the stirrup 50 and when swung upwardly its furcations engage a bar 62 formed at the lower end of the link 49. It is apparent that when the shaft 51 is turned in a clockwise direction, the cam 54 and the arm 60 will act to press the pivots and bearings of the platform lever mechanism firmly together with a force dependent on the stiffness of the springs 55 and 61. Since only a small part of the force exerted by the cam 54 to draw the platform downwardly is transmitted to the link 49, the arm 60, acting under the influence of the spring 61, will hold the link 49 in elevated position and permit the pendulum mechanism to assume a zero position, in which position it may be locked, if desired, by any preferred locking device.

For the purpose of normally holding the cam 54 and the arm 60 out of engagement with the weighing mechanism, a spring 63, with its ends connected respectively to the casting 52 and a collar 64 fixed on the shaft 51, is wound upon the shaft to constantly urge it in a counter-clockwise direction. Fixed to the end of the shaft 51 which projects through the rear wall 6 of the housing 1 is an arm 65 having a pedal 66 pivoted thereto at its free end, and depending from the pedal is a hook 67 which may be engaged with a bar 68 when the pedal is depressed. When it is desired to move the scale, the pedal is pushed downwardly, thereby rotating the rock shaft 51 in a clockwise direction against the tension of the spring 63 and swinging the cam 54 into engagement with the roller 56 and the arm 60 into engagement with the bar 62 on the link 49, so that the pivots and bearings of the platform lever mechanism are firmly pressed together. While the pedal is depressed it may be tilted to engage the hook 67 with the bar 68 and thus retain the parts in locked position.

Since the rear end of the scale is carried on castors, it is quite easily moved sideways. In order to prevent movement of this end of the scale as trucks are pushed up the approaches 37, I have provided a brake consisting of a threaded post 70 co-operating with an internally-threaded boss 71 secured to the deck 43. A foot 72 is slidably and rotatably mounted on the lower end of the post 70 and is pressed downwardly by a spring 73, the tension of which may be adjusted by moving the collar 74. The upper end of the post 70 is provided with a hand wheel so that it may be turned to press the foot against the floor to hold the scale against movement.

While it will be apparent that the illustrated embodiment of my invention herein disclosed is well calculated to adequately fulfill the objects primarily stated, it is to be understood that the invention is susceptible to variation, modification and change within the spirit and scope of the subjoined claims.

Having described my invention, I claim:

1. In a portable weighing scale, in combination, a frame, means for supporting said frame upon an unbroken flat floor, levers fulcrumed upon said frame, a commodity-receiver, and pivots supporting said commodity-receiver from said levers, said commodity-receiver having sloping approaches, portions of said approaches lying intermediate the pivots supporting said levers.

2. In a portable weighing scale, in combination, a frame, means for movably supporting said frame upon an unbroken flat floor, levers of the third order fulcrumed on said frame, a commodity-receiver, and pivots supporting said commodity-receiver from said levers, said commodity-receiver having sloping approaches, portions of said approaches lying inside the pivots supporting said levers.

3. In a portable weighing scale, in combination, a frame, wheels supporting said frame, levers fulcrumed upon said frame, a commodity-receiver, and pivots supporting said commodity-receiver from said levers, said commodity-receiver having sloping approaches rigid therewith, portions of said approaches lying intermediate the pivots supporting said levers.

4. In a weighing scale, in combination, a frame comprising longitudinally-extending members, end members extending upwardly from said longitudinally-extending members, platform levers supported by said end members, a commodity-receiver comprising a substantially level portion and sloping approaches, a torsion lever extending beneath the level portion of said commodity-receiver, said approaches extending below the level of said commodity-receiver, and means operatively connecting said torsion lever and said platform levers.

5. In a weighing scale, in combination, a frame comprising longitudinally-extending members, end members extending upwardly from said longitudinally-extending members, platform levers supported by said end members, a commodity-receiver including portions extending over said platform levers, a torsion lever extending beneath said commodity-receiver, and means operatively connecting said torsion lever and said platform levers.

6. In a weighing scale, in combination, a frame comprising longitudinally-extending members, end members extending upwardly from said longitudinally-extending members, platform levers, pivots supporting said platform levers from said end members, a commodity-receiver including sloping approaches, said sloping approaches lying inside the pivots supporting said platform levers, a torsion lever extending beneath said commodity-receiver, and means operatively connecting said torsion lever and said platform levers.

7. In a weighing scale, in combination, longitudinally-extending members, end members extending laterally from said longitudinally-extending members, platform levers supported by said end members, a commodity-receiver including sloping approaches, pivots supporting said commodity-receiver from said platform levers, said sloping approaches lying partially inside said pivots, a torsion lever extending beneath said commodity-receiver, and means operatively connecting said torsion lever and said platform levers.

8. In a weighing scale, in combination, a frame comprising longitudinally-extending members, end members extending laterally upwardly therefrom, platform levers supported by said end members above the level of said longitudinally-extending members, a commodity-receiver lying below the level of said levers and having a level portion and sloping approaches, pivots supporting said commodity-receiver from said levers, said sloping approaches lying partially inside said pivots, a torsion lever extending beneath said commodity-receiver, and means operatively connecting said torsion lever and the platform levers.

9. In a weighing scale, in combination, a frame having substantially vertical walls, a commodity-receiver having walls substantially parallel to and spaced from the walls of said frame, levers lying between said spaced walls, and means whereby said levers are supported upon the vertical walls of said frame and connected to the walls of said commodity receiver.

10. In a weighing scale, in combination, a frame having substantially vertical walls, low-lying longitudinally-extending members connecting said walls, a commodity-receiver having a portion overlying said longitudinally-extending members, said commodity-receiver having walls substantially parallel to the walls of said frame, levers between the walls of said frame and said commodity-receiver and means whereby said levers are supported upon the vertical walls of said frame and connected to the walls of said commodity receiver.

11. In a weighing scale, in combination, a frame having substantially vertical walls, low-lying longitudinally-extending members connecting said walls, a commodity-receiver having a portion overlying said longitudinally-extending members and having sloping approaches and walls substantially parallel to the walls of said frame, and levers between the walls of said frame and said commodity-receiver and connected thereto.

12. In a weighing scale, in combination, a frame having substantially vertical walls, low-lying longitudinally-extending members connecting said walls, carrying wheels supporting said frame, a commodity-receiver having a portion overlying said longitudinally-extending members, said commodity-receiver having walls substantially parallel to the walls of said frame, and levers between the walls of said frame and said commodity-receiver and connected thereto.

13. In a weighing scale, in combination, a frame having substantially vertical walls, low-lying longitudinally-extending members connecting said walls, castor wheels at the forward end of said frame, a floor brake adjacent said castor wheels, a commodity-receiver having a portion overlying said longitudinally-extending members, said commodity-receiver having walls substantially parallel to the walls of said frame, and levers between the walls of said frame and said commodity-receiver and connected thereto.

14. In a weighing scale, in combination, a frame having substantially vertical walls, low-lying longitudinally-extending members connecting said walls, a commodity-receiver having a portion overlying said longitudinally-extending members and having sloping approaches and walls substantially parallel to the walls of said frame, levers between the walls of said frame and said commodity-receiver and connected thereto, and ramps non-rigidly connected to said frame and adapted to lie adjacent said sloping approaches.

15. In a weighing scale, in combination, a pair of levers of different multiplications, a torsion lever having an arm, and means connecting the first said levers respectively to different points on said arm whereby the combined multiplication of either of the first said levers and said torsion lever is equal to the combined multiplication of the other of the first said levers and said torsion lever.

16. In a weighing scale, in combination, a commodity-receiver, lever mechanism, connections between said commodity-receiver and said lever mechanism including knife-edge pivots and grooved bearings, and means for resiliently holding said pivots and bearings in forcible engagement and means for releasing said pivots and bearings from said holding means.

17. In a weighing scale, in combination, a frame, a commodity-receiver, lever mechanism, connections between said lever mechanism and said commodity-receiver and said lever mechanism and said frame including knife-edge pivots engaging bearings and a rock shaft journaled in said frame, means resiliently connected with said shaft and adapted to depress said platform when said shaft is rocked, means resiliently connected to said shaft and adapted to move said lever mechanism and thereby resist downward movement of said platform when said shaft is rocked, and means for rocking said shaft.

18. In a weighing scale, in combination, a frame, a commodity-receiver, lever mechanism, connections between said lever mechanism and said commodity-receiver and said lever mechanism and said frame including knife-edge pivots engaging bearings and a rock shaft journaled in said frame, means resiliently connected with said shaft and adapted to depress said platform when said shaft is rocked, means resiliently connected to said shaft and adapted to move said lever mechanism and thereby resist downward movement of said platform when said shaft is rocked, means for rocking said shaft, and resilient means for resisting rocking movement of said shaft.

EDWARD G. THOMAS.

Witnesses:
C. E. WILCO,
C. O. MARSHALL.